Oct. 1, 1968   B. J. BLISS   3,403,999
MANUFACTURE OF BRAZE SHIM STOCK
Filed Oct. 13, 1965
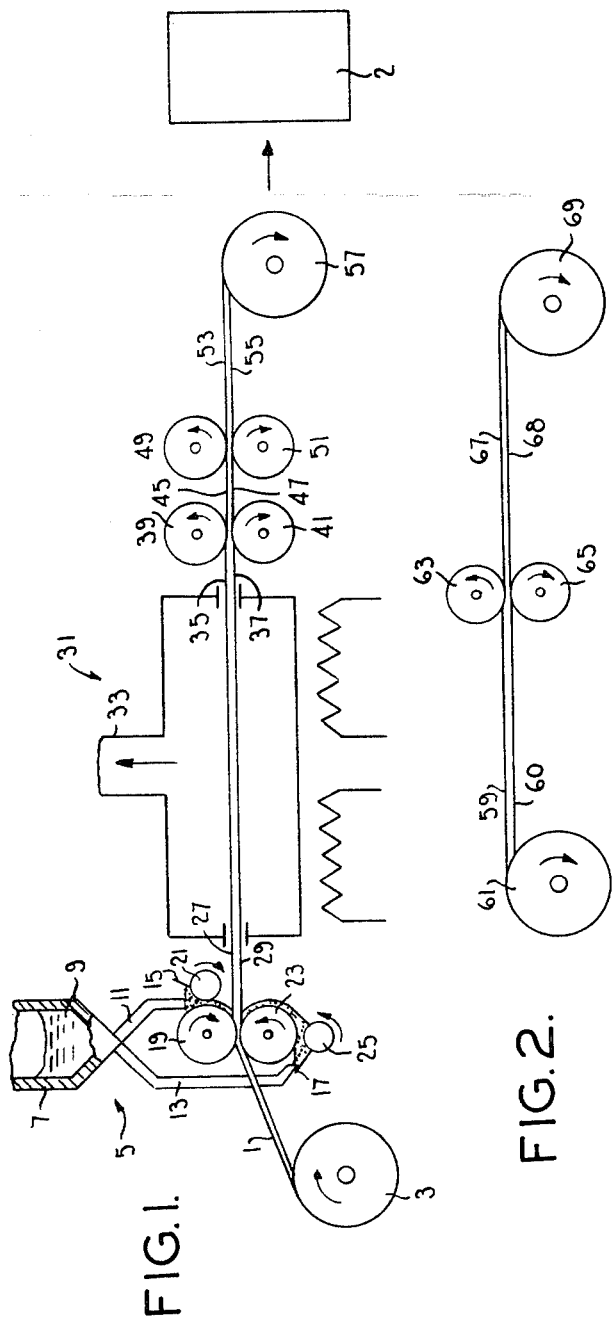
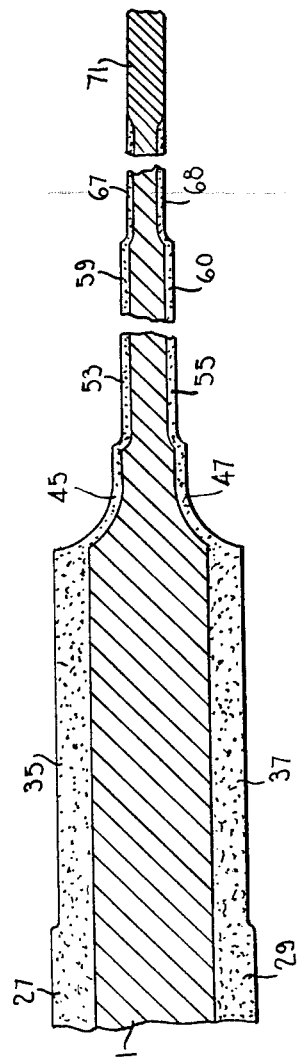
Bruce J. Bliss,
Inventor.
Koenig, Senniger, Powers and Leavitt,
Attorneys.

United States Patent Office 3,403,999
Patented Oct. 1, 1968

3,403,999
MANUFACTURE OF BRAZE SHIM STOCK
Bruce J. Bliss, North Attleboro, Mass., assignor to Texas Instruments Incorporated, Dallas, Tex., a corporation of Delaware
Filed Oct. 13, 1965, Ser. No. 495,505
12 Claims. (Cl. 75—208)

ABSTRACT OF THE DISCLOSURE

A base strip of metal is coated with a slurry composed of a binder and metal particles which with a metal of the strip can form an alloy. The slurry is heated only enough to dry it, after which the coated strip is first reduced by rolling to effect grain bonding only and then sintering at a temperature sufficient only to improve the grain bond without alloying. Thereafter, alloying is accomplished by heating at a higher temperature.

---

This invention relates to the manufacture of braze shim stock in foil form useful for high-temperature brazing and similar operations for joining parts, cladding and the like.

Among the several objects of the invention may be noted the provision of an improved method and apparatus for manufacturing an improved thin sheet or strip in foil form for brazing or like operations; the provision of a method which during manufacture preserves malleability so as to minimize cracking problems; and the provision of improved stock material which permits more accurate control of the brazing operations. Other objects and features will be in part apparent and in part pointed out hereinafter.

The invention accordingly comprises the methods, products and constructions hereinafter described, the scope of the invention being indicated in the following claims.

In the accompanying drawings in which one of various possible embodiments of the invention is illustrated, FIGS. 1 and 2 are diagrammatic views illustrating steps in the manufacture of strip or foil alloy material made in accordance with the invention; and FIG. 3 is a view foreshortened in length, illustrating diagrammatically modifications of certain materials which occur as they pass through the process according to the invention.

Corresponding reference characters indicate corresponding parts throughout the several views of the drawings.

In the following description, foil refers to thin sheet-metal material the thickness being a few thousandths of an inch. Powder means a finely divided or particulate substance. The term slurry means a liquid medium of substantial viscosity containing metal particles suspended in a binder. The term binder means compounds characterized in that their constituents when mixed with a liquid such as water act according to the invention to hold or bind the metal particles in suspension and to produce adequate viscosity in the slurry for adherence to a smooth surface. Thus the slurry will adhere evenly to metal surfaces contacted by it. These may be long-chain, high-molecular weight organic compounds characterized as stringy and which swell in the presence of a liquid. Examples, but without limitation, of suitable binders are methyl cellulose, nonionic celluose ether, polyethylene oxide, polyvinyl pyrrolidone, et cetera. The intended use of the foil will determine the particular gauge to which it is manufactured. The drawings are illustrative and not to scale because of the small dimensions involved.

High-temperature brazing alloys have previously been available only as coarse powders and also as plastic strips impregnated with such particles. The alloys have been provided in these forms to avoid cracking problems. The use of dry powders makes cladding and brazing operations difficult to control. The same is true of plastic-impregnated strips, due to the presence of the plastic during brazing or cladding. Brazing operations in which the product of the invention is useful occur, for example, in the range of 1800° F. to 2200° F. Typical of the high-temperature brazing alloys which are available in powder or impregnated plastic strip form is an alloy known as Aeronautical Materials Specification (AMS) 4778 which comprises by weight 91.54% nickel, 1% steel, .06% carbon, 2.90% boron and 4.50% silicon.

Briefly, the present process comprises coating a thin base sheet or strip of clean metal such as nickel (for example) with a substantially homogeneous slurry containing a binding compound and particles of the several different materials supplying the other elemental metals required therewith to form the desired alloy, such as, for example, silicon, boron, carbon, iron, iron oxide; solidifying the coated slurry by heating to dry it; rolling the dry coating on the base strip with substantial enough reduction for solid-phase green bonding; rolling the green-bonded layer and strip lightly (if desired) for smoothing; sintering at a temperature and for a time sufficient to drive off the binding compound and substantially improve the green bonds by some diffusion in the solid phase but insufficient for complete alloying; and then (if desired) rolling the resulting strip to the desired finished gauge. The composite strip thus formed is substantially unalloyed and malleable and is useful for brazing. Alloying takes place during brazing. Or the strip may be sintered again at a temperature high enough and for a time sufficient to alloy the base strip and the metals coated on it by solid-state diffusion so as to form a homogeneously alloyed composite which is brittle. In either case the heavy rolling for the substantial reduction to provide solid-phase green bonding precedes complete alloying and thus avoids the cracking difficulties that would be encountered if such rolling and reduction were to occur after alloying.

The slurry used may include a mixture of a long-chain high-molecular-weight organic compound acting as a binder, a carrier or solvent such as water, and powders of constituent metals. The metals in the slurry are present in a homogeneous dispersion in the proportion they are required to combine with the base strip to form the desired final alloy. The amount of powder used to make up the slurry must be determined (in part) by the total quantity of powders in relation to the amount of the elemental nickel in the base strip which is to be coated by the slurry, because all of these ultimately become constituents of the desired alloy. Consideration should also be given to the amount of iron that may be obtained by reduction from iron oxide ($Fe_2O_3$) when the oxide is employed in the slurry to obtain by oxide reduction the quantity of iron needed in the ultimate alloy. The same is true in other cases in which an oxide of the desired metallic constituent is used to supply such constituent.

The contents of the slurry are thoroughly mixed so that the constituent particles are evenly suspended by the binder. The amount of binder used in relation to the solvent affects the final viscosity of the slurry and this should be selected so that when the slurry is brushed, sprayed, dipped or roller-coated (for example) on the base strip it will cling thereto until there is some metal-to-metal bond between the particles of the slurry and the base strip to hold them together. The percentage of solids in the slurry may vary widely, depending on the alloy being formed, the thickness of the slurry coating to be applied, the quantity of metal present in the base strip, the desired ratio of the metal in the base strip to the metal suspended in the slurry, et cetera. The slurry viscosity should be such that when it is evenly applied on the base metal strip it will remain substantially even in any position of the metal surface and will cling to either upper or lower surfaces. In some (but not all) cases a conventional wetting agent (such as an aerosol) may be used to advantage in the slurry.

A slurry for coating a 2 x 4 x .015 inch thick nickel sheet may comprise 37 grams of −150 mesh boron powder, 55 grams of silicon powder and 15 grams of ferric oxide powder dispersed in a binder consisting of 250 cc. of 2% methyl cellulose in water. In this instance the methyl cellulose acts as both a wetting agent for the powders and a binder for the necessary slurry-to-strip adhesion. Ferric oxide is used in this example rather than elemental iron powder because of its fine size and its extending ability in the slurry. The boron, silicon and iron (to be provided by the iron oxide) in the slurry constitute by weight about 8.46% of the final alloy and the nickel constitutes approximately 91.54%. This is generally equivalent to the known AMS 4778 alloy. The nickel strip is thoroughly cleaned and degreased so that its surface is substantially free of foreign materials which might impair clinging of the slurry to the nickel surfaces, or result in impurities in the final alloy, or impede bonding the metal powders in the slurry to the nickel strip. This cleaning and degreasing may be carried out in a conventional manner by wire brushing, chemical etching, pickling, et cetera.

Referring now to FIGS. 1 and 3 of the drawings, the cleaned nickel strip is designated 1. It is unrolled from a reel 3 and fed to coating apparatus such as a conventional reverse-roll roller coater generally designated 5 in FIG. 1. The roller coater 5 includes a reservoir 7 which receives slurry 9 prepared in the manner previously set forth. The slurry is delivered through passages 11 and 13 to an upper trough 15 and a lower trough 17. An upper coating roller 19 picks up slurry 9 from the trough 15 and coats it evenly on the upper surface of the strip 1 as it passes beneath roller 19. The quantity of slurry coated on top of the strip is determined by the spacing of a metering roller 21 from roller 19. In a similar manner the bottom surface of strip 1 is evenly coated by slurry passing between a coating roller 23 and a metering roller 25. The upper and lower coated layers are designated 27 and 29 in FIG. 3. The slurry may have a total thickness of about 20% of the thickness of strip 1 and may be applied either to one surface only of the strip or divided between the upper and lower surfaces. One or the other of the coatings 27 and 29 may be thicker, if desired.

The base strip 1 with the slurry coating thereon is subjected to a heating step for drying the coatings. The coatings may be dried in a conventional electric heater or furnace designated 31 in FIG. 1, which may be either of the single-stage type, or a two-stage type wherein the left-hand portion is at a lower temperature than the right-hand portion. When a single-stage heater is used, its temperature is sufficiently high to vaporize and drive off the solvent (water) in the slurry through flue 33 and it may be sufficiently high also to vaporize and drive off part (but not all) of the binder. Where a two-stage heater is provided, the left portion is hot enough to drive off the solvent. The right-hand portion of the heater may be of higher temperature, whereby a portion of the binding compound may be driven off. Not all of the binding compound is removed since at this stage this is the basic means for holding the coating on the base strip 1. When the coatings leave the furnace 31 on the strip they are dry and slightly thinner, as illustrated at 35 and 37 in FIG. 3.

Next the dried strip 1, including its coatings 35, 37, is passed through apparatus for effecting a substantial reduction in over-all thickness. This may be accomplished by passing the coated strip between squeeze rolls 39 and 41. The amount of reduction effected may range from 20% to 60% of the total thickness so as to effect so-called solid-phase green bonding. A reduction of about 33% or so is preferred. The strip coatings after reduction are designated 45 and 47 in FIG. 3. During this reduction, metal particles in the coatings are solid-phase green-bonded to one another and some of them to the nickel strip, thus making up a substantially noncracking, malleable or ductile composite.

The base and coatings are then passed through squeeze rolls 49 and 51 where they are given a light, so-called kiss pass which only slightly reduces their combined thickness and has the primary effect of smoothing out roughness that may exist at this time on the coating surfaces. The coatings are designated 53 and 55 in FIG. 3 as they leave the rolls 49 and 51. While the amount of reduction obtained by squeeze rolls 39 and 41 may be varied, an example of the reduction that may be effected is illustrated by assuming an initial thickness of about 0.015 inch for strip 1, with total wet slurry coatings of about 20% of the thickness of strip 1. This will make a total thickness in the heater 31 of about .018 inch. Drying will slightly reduce this thickness. Upon the approximately 33% reduction by rolls 39, 41 a thickness of .012 inch is obtained. Rolling between rolls 49, 51 reduces this by about .002 inch, with a resulting total thickness emerging from rolls 49, 51 of .010 inch or so. The coatings 53 and 55 at this time are very dense and metal particles in the coatings are green-bonded in the solid state to the strip 1. However, there has been no alloying of metals in the coating and strip so the coated strip remains malleable or ductile. The strip and coatings thereon then may be coiled without cracking, as showing at 57 in FIG. 1.

The reel 57 is then placed in or passed through a conventional sintering furnace (illustrated at 2 in FIG. 1) where it is heated at a sufficiently low temperature and for a time less than required to alloy the metal in the coatings 53, 55 and the base strip 1. The temperature-time conditions are such that grain growth is promoted between the green-bonded coating particles and the nickel strip so as to improve the bonds. Sintering at 1750° F. for fifteen minutes will accomplish this without substantial alloying. When the base strip or the metal particles in the coatings contain ferric oxide to supply the desired iron content in the final alloy, the sintering furnace 2 should contain a reducing atmosphere (such as cracked ammonia) for reducing oxide to iron. It will be understood that the amount of iron oxide used shall have been such that at this stage the proper amount of elemental iron accrues. Substantially all of the binding compound remaining in the slurry coatings at this time are driven off in the sintering furnace 2. The sintered coatings are designated 59 and 60 in FIG. 3. The roll of the strip as sintered is shown at 61 in FIG. 2. Since the metals in the strip and coatings do not substantially alloy during this sintering step, they still remain ductile.

Following the sintering step, the coated strip may be drawn from roll 61 and given a kiss pass through squeeze rolls 63 and 65 of a conventional rolling mill so as to bring the strip to final gauge. The resulting final dimension may be .004 inch for example being then in foil form. The rolled coatings at this stage are shown at 67 and 68 in FIG. 3. The strip and coatings may then be coiled as shown at 69. The foil in this unalloyed state may be sold for high-temperature brazing. In the course of brazing, the temperature will be high enough to bring about alloying of the materials composing the coated strip. On the other hand, following the rolling step the coated strip (before use) may be sintered a second time at higher temperature and for a time sufficient substantially completely to alloy the metals in the coating with each other and with the metal in the base strip, causing the strip to become a homogeneous relatively brittle alloy. This second sintering temperature and time may be 1950° F. over a period of about 15 minutes (for example). Alloying does not occur in the liquid state but occurs by diffusion in the solid state, thus preserving the desired dimensions. Such an alloy strip has been designated 71 in FIG. 3.

As above made clear, the coated strip may be used as a finished ductile product for cladding or brazing without undergoing the last-described sintering step. The chief advantage of eliminating this last step is that the nickel and coating metals are not alloyed at that time and therefore they remain ductile or malleable, making the strip easier to apply for brazing, particularly on nonplanar surfaces, alloying of the nickel in the strip and the metals in the coatings occurring during the brazing or cladding operations. The fact that the strip becomes an alloy (and thus brittle) during the second sintering step before use (as above mentioned) is not disadvantageous for many applications, such as use in brazing on flat surfaces. In this case brittleness of the final product is not disadvantageous.

The following is a more particularized example of how the process of the invention has been performed to manufacturer a strip of high-temperature nickel base brazing alloy.

First a slurry was mixed, using a solution of 2% methyl cellulose in water to form a binder. To 250 cc. of this binder solution was added 37 grams of −150 mesh boron powder, 55 grams of silicon powder and 15 grams of ferric oxide powder. The ferric oxide was used instead of elemental iron powder (which might have been used) because of the oxide's fine size and superior extending ability in the slurry. This slurry was thoroughly mixed and the powdered material dispersed throughout the binder. A nickel strip of about 2.0 x 12.00 x 0.015 inches was cleaned and degreased. The nickel strip was coated on both sides with slurry to a total wet thickness of about 20% of the thickness of the nickel strip. The coating was then dried and bonded by effecting a reduction of substantially 33% in the thickness of the strip and coating. The strip and coating were then rolled to a total thickness of about 0.010 inch and sintered for 15 minutes at about 1750° F. in a reducing atmosphere of cracked ammonia. This atmosphere reduced the iron oxide particles to iron. The sintering temperature and time were insufficient to alloy the nickel base strip and the metals of the coating. It was sufficient to improve the green bonds. Ductility was thus maintained. After this sintering step the alloy strip became substantially free of solvent and binding compound. The ductile strip was then rolled to a final thickness of about 0.004 inch. The ductile strip and coating were then sintered again at a temperature of about 1950° F. for several minutes or more. During the last sintering step the boron, silicon and iron (from the iron oxide) in the slurry coatings were diffused with the nickel strip to form the desired homogeneous alloy of nickel-boron-silicon-iron. This last sintering step is optional and may be eliminated if a ductile finished form of the strip is desired, as is often the case.

Another example of the weight ratios of metals to be employed may be 91.54% nickel for the strip and 4.50% silicon, 2.9% boron, 0.06% carbon and 1.00% steel for the powders. This produces the equivalent to AMS 4778 alloy.

As another example, an alloy can be prepared according to the preceding examples by using particles of chromium and silicon in the slurry and having them present in a ratio relative to each other and to a nickel strip to which they are applied so that the metals are present in the final alloy in the weight ratio of 71% nickel, 19% chromium and 10% silicon. Similarly, an alloy strip equivalent to AMS 4777 can be made consisting by weight of 2.5% iron, 3.0% boron, 4.5% silicon, 6.5% chromium, with the balance nickel. An AMS 4775 alloy strip may also be prepared as described, consisting by weight of 3.85% boron, 4.00% iron, 4.5% silicon, 16.5% chromium, with the balance nickel. It will be understood that in each of the examples the nickel is present in strip or sheet form and the other metals are provided in particulate form in the slurry which is coated on the nickel strip.

The strip or foil obtained by the processes of the invention provides for better control of cladding and brazing operations than is achieved by using either powder-metal-impregnated plastic strips or loose powders of prealloyed metals as is now common practice.

It will be understood that while the resulting strip or foil has been described as useful for brazing operations, the resulting alloy may be used in other applications.

It will also be noted from the above that the metal particles employed are generally elemental metals. However, this is not always true, as in the case of $Fe_2O_3$. This is a compound but it contains iron to which the oxide is reduced before the alloyable form of the strip is obtained. Therefore, in order to avoid circumlocution in the appended claims, any material of which the strip is composed or any of the particles carried thereon which are in the form of a metal, or an oxide of a metal capable of deoxidation to form the metal, will be referred to as a metallic substance or metallic.

In view of the above, it will be seen that the several objects of the invention are achieved and other advantageous results attained.

As various changes could be made in the above methods, products and constructions without departing from the scope of the invention, it is intended that all matter contained in the above description or shown in the accompanying drawings shall be interpreted as illustrative and not in a limiting sense.

What is claimed is:
1. The method of manufacturing braze shim stock comprising
   coating on a metallic substance in the form of a clean base layer a substantially homogeneous slurry containing a binder and particles of at least one metallic substance in a proportion to provide a ratio of elemental metals for subsequent alloying,
   heating the coated strip to dry the slurry and form a dry coat in an atmosphere to convert any of the metallic substance which is not an elemental metal into an elemental metal,
   squeezing the dry coated strip with a substantial reduction in thickness to solid-phase green-bond elemental particles in the slurry to one another and some of them to the strip and to drive off substantially all of the binder and to form a composite, and heating the composite to sinter it to improve the bonds.
2. The method according to claim 1, including the step of again heating the composite to sinter it to form an alloy of the metals of the base strip and of the particles by diffusion therebetween in the solid state.
3. The method of manufacturing braze shim stock comprising
   coating on a clean metal base strip a substantially homogeneous slurry containing a binder and particles of at least one metallic substance in a proportion to provide a ratio of elemental metal with respect to the elemental metal of the base strip for subsequent alloying,
   heating the coated strip to dry the slurry and form a dry coat in an atmosphere to convert any of the metallic substance which is not an elemental metal into an elemental metal,
   squeezing the dry coated strip with a substantial reduction in thickness to solid-phase green-bond elemental particles in the slurry to one another and some of them to the strip and to drive off substantially all of the binder,
   and to form a composite, and heating the composite to sinter it to improve the bonds.
4. The method according to claim 3, including the step of again heating the composite to sinter it to form an alloy of the metals of the base strip and of the particles by diffusion therebetween in the solid state.

5. The method of manufacturing braze shim stock comprising
    coating on a metallic substance in the form of a clean base layer a substantially homogeneous slurry containing a binder and particles of at least one metallic substance in a proportion to provide a ratio of elemental metals for subsequent alloying,
    heating the coated strip to dry the slurry and form a dry coat in an atmosphere to convert any of the metallic substance which is not an elemental metal into an elemental metal,
    squeezing the dry coated strip with a substantial reduction in thickness to solid-phase green-bond elemental particles in the slurry to one another and some of them to the strip and to drive off substantially all of the binder of the slurry to form a composite,
    rolling the composite to smooth it,
    heating the composite to sinter it to improve the bonds, and again rolling the composite to final thickness.

6. The method according to claim 5, including the step of again heating the composite to sinter it to form an alloy of the metals of the base strip and particles by diffusion therebetween in the solid state.

7. The method of manufacturing braze shim stock comprising
    coating on a clean elemental metal base strip a substantially homogeneous slurry containing a binder and groups of metal particles in proportions to provide a ratio of metals with respect to the metal of the base strip for subsequent alloying therewith,
    heating the coated strip to dry the slurry,
    squeezing the dry coated strip with a substantial reduction to solid-phase green-bond elemental particles in the slurry to one another and some of them to the strip and to drive off substantially all of the binder of the slurry to form a composite,
    and heating the composite to sinter it to improve the bonds without alloying.

8. The method according to claim 7, including heating the composite a second time at a temperature sufficient to diffuse in the solid state of the composite all of the elemental metals of the base strip and of the particles to form an alloy of said metals.

9. The method according to claim 7, including
    the step of rolling the composite after said substantial reduction in its thickness to smooth it, and
    the step of rolling the composite after said improvement in the green-bonds to bring it to final gauge before alloying.

10. The method according to claim 8, including
    the step of rolling the composite after said substantial reduction in its thickness to smooth it before said first sintering step and
    the step of rolling the composite after said first sintering step and before said second sintering step to bring the composite substantially to final gauge before alloying.

11. The method of manufacturing braze shim stock comprising
    coating on a nickel base strip a substantially homogeneous slurry containing a binder and groups of particles, the particles of at least one of which groups being in the form of elemental metal, the particles in at least one other group being in the form of a metallic oxide reducible to its subsisting elemental metal,
    heating the strip to dry the slurry in an atmosphere to convert said oxide to its subsisting metal,
    squeezing the dry coated strip with a substantial reduction in thickness to solid-phase green-bond elemental particles in the slurry to one another and some of them to the strip,
    rolling the green-bonded composite to smooth it,
    sintering the green-bonded composite to improve the bonds, and
    rolling the composite in which the green bonds have been improved to finished gauge.

12. The method according to claim 11, including the step of again sintering the composite at finished gauge to form an alloy of the metals in the component by diffusion therebetween in the solid state.

References Cited
UNITED STATES PATENTS

| | | | |
|---|---|---|---|
| 3,197,847 | 8/1965 | Kerstetter | 75—208 X |
| 3,330,654 | 7/1967 | Sweet | 75—208 |
| 3,331,684 | 7/1967 | Storchheim | 75—208 |
| 3,335,000 | 8/1967 | Bliss | 75—214 |
| 3,335,002 | 8/1967 | Clarke | 75—214 X |
| 3,359,096 | 12/1967 | Losy | 75—208 X |

CARL D. QUARFORTH, Primary Examiner.

A. J. STEINER, Assistant Examiner.